June 25, 1957     L. T. SKEGGS     2,797,149
METHODS OF AND APPARATUS FOR ANALYZING LIQUIDS CONTAINING
CRYSTALLOID AND NON-CRYSTALLOID CONSTITUENTS
Filed Jan. 8, 1953     5 Sheets-Sheet 1

INVENTOR.
LEONARD T. SKEGGS
BY
ATTORNEYS

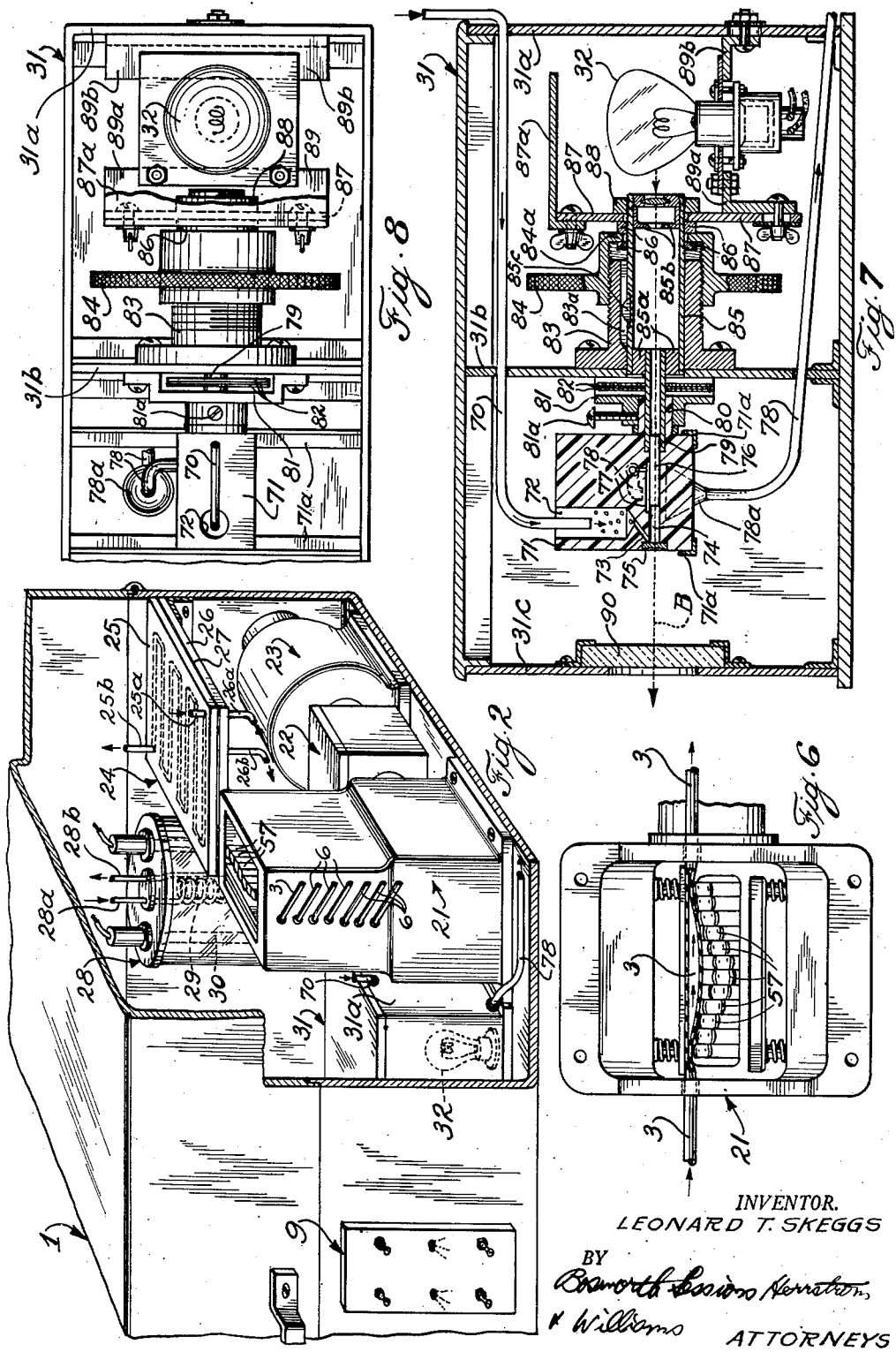

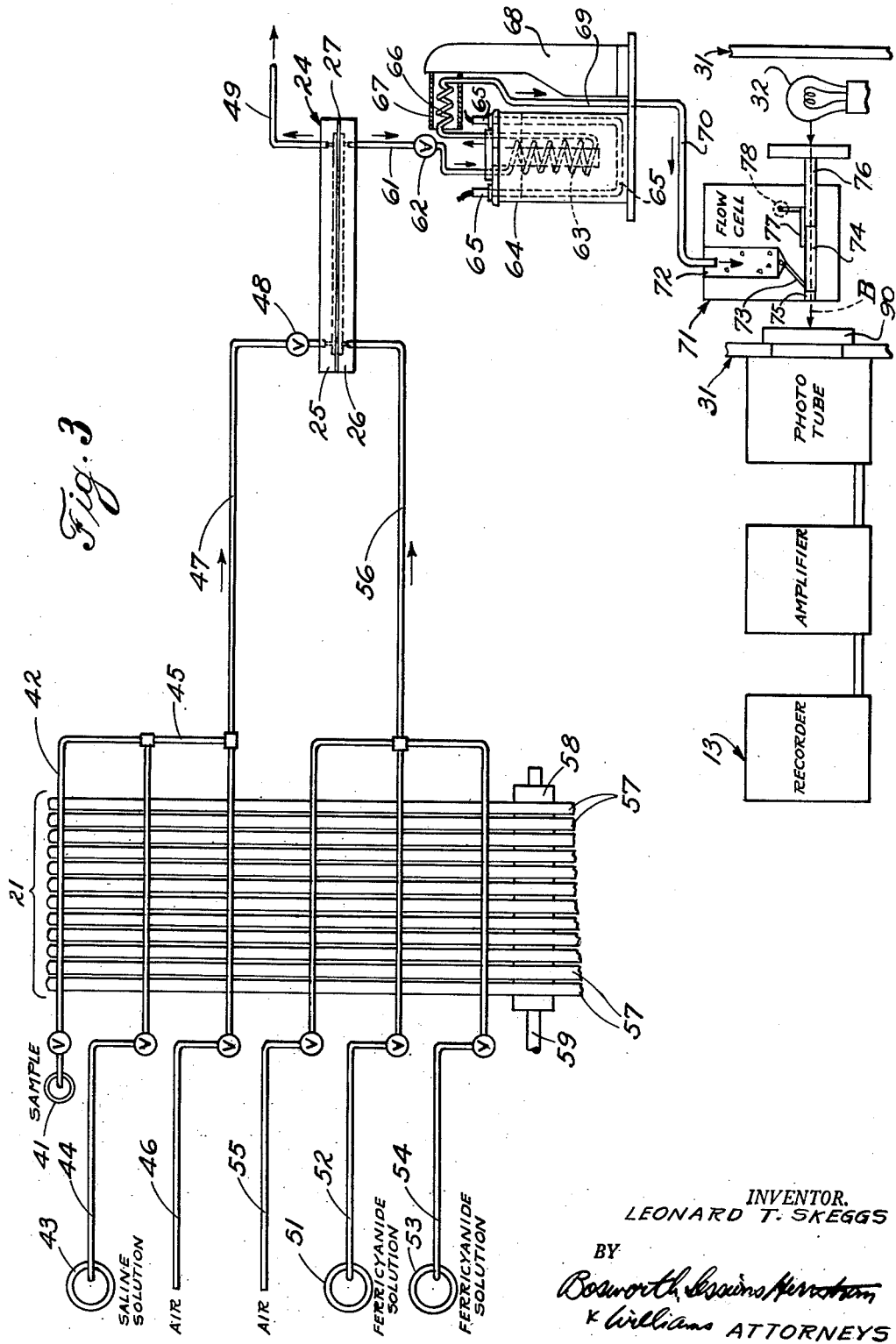

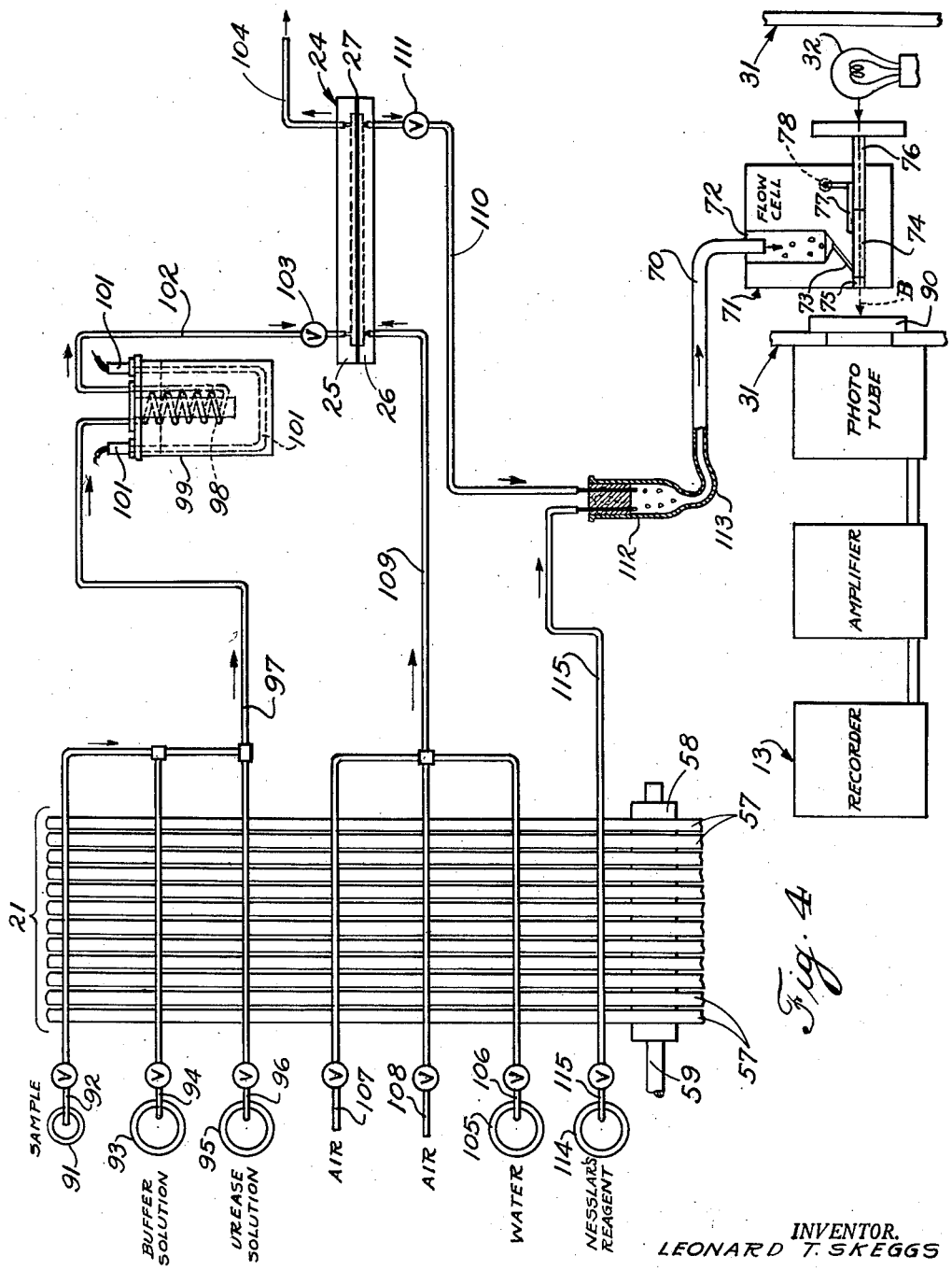

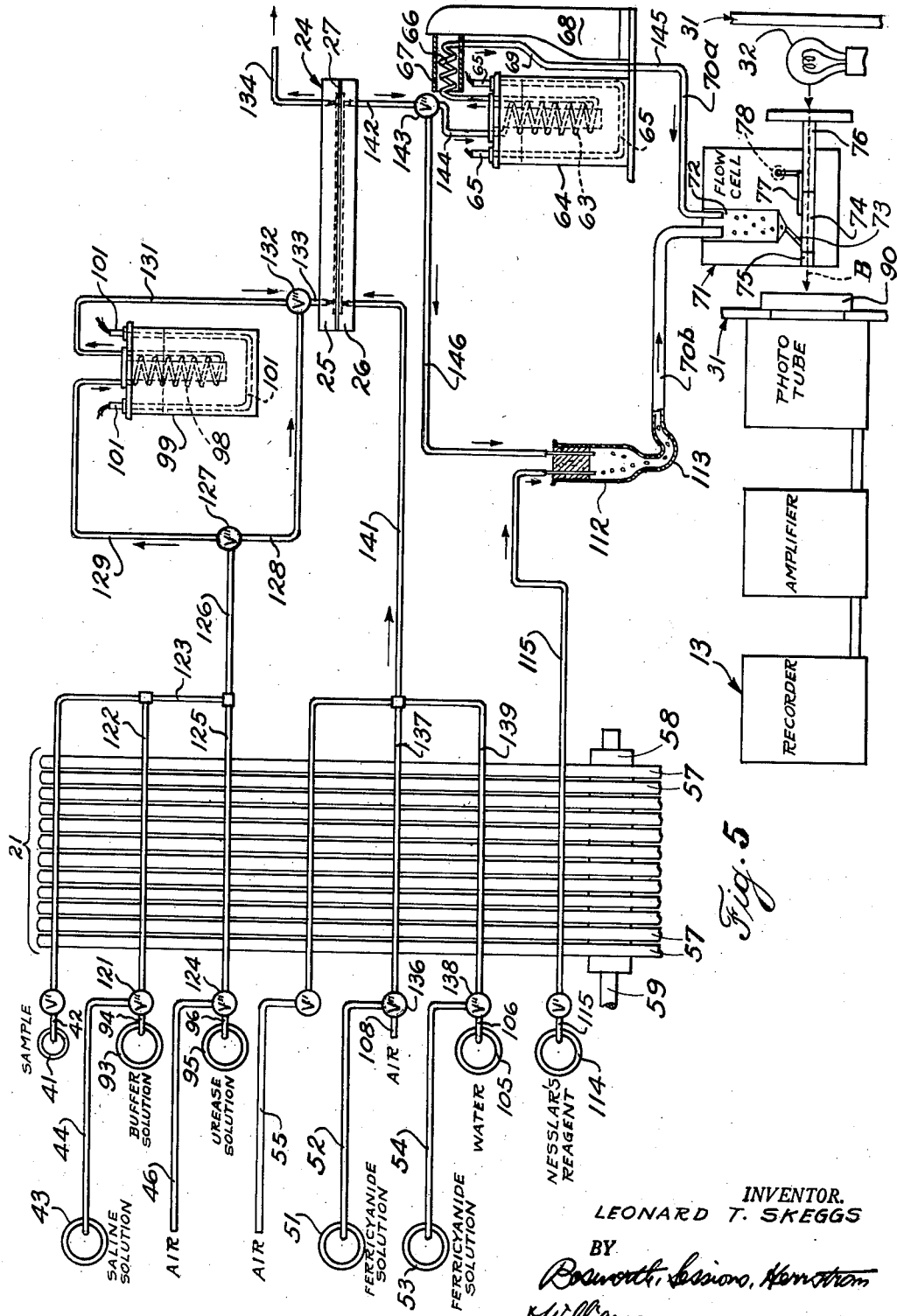

United States Patent Office 2,797,149
Patented June 25, 1957

2,797,149

METHODS OF AND APPARATUS FOR ANALYZING LIQUIDS CONTAINING CRYSTALLOID AND NON-CRYSTALLOID CONSTITUENTS

Leonard T. Skeggs, Berea, Ohio, assignor to Technicon International, Ltd., New York, N. Y., a corporation of New York Application January 8, 1953, Serial No. 330,211

26 Claims. (Cl. 23—230)

This invention relates to methods of and apparatus for analyzing body fluids for diagnostically significant factors and, more particularly, to methods and apparatus permitting such analyses to be made in a continuous manner.

In hospitals, clinics and laboratories where samples of body fluids are analyzed for diagnostically significant factors such as sugar, urea, etc., it is the usual practice to make the various determinations with individual attention to them and personal performance of such incidental operations as readying the test sample, adding standard reagents, heating the mixture, etc. If, as in a hospital, the number of samples to be analyzed is very large, a correspondingly large number of technicians of one sort or another is needed. In addition, there is of necessity much handling, washing and drying of glassware with attendant likelihood of breakage. It is a principal object of the present invention to provide ways and means for making such determinations by machine in a continuous manner with a minimum of personal attention and little equipment of a kind that requires repeated handling, washing, drying, etc.

Other principal objects of the invention are to provide processes and apparatus permitting of the use of fewer technicians, assistants and bottle washers than are ordinarily necessary where conventional practices and equipment are employed; to provide processes and apparatus of a nature such that after a minimum period of instruction even relatively unskilled persons can make the desired determinations; to provide methods and machines that can be depended on to give visual indications and, if desired, a permanent record of the determinations that are being made; and, from what may be called an operational standpoint, to provide a machine which is always set up and ready to run, which is foolproof in the sense that it incorporates means by which to check and calibrate the machine from time to time or even before and after making each determination, as by running known samples through it, which is so designed that successive samples may be spaced from each other and segregated by air without the likelihood of mixing such samples, and with the aid of which samples of different characteristics may be analyzed continuously, one after another, at intervals between starts which may be as little as one or two minutes.

Still other principal objects of the invention are to provide processes and apparatus for continuously analyzing blood and other body fluids for urea, glucose or other diagnostically significant factors; to provide processes and apparatus which, for the determination of a diagnostically significant factor such as urea, glucose or the like, necessitate the use of only a relatively small test sample, frequently as little as and even less than one cubic centimeter; to provide processes and apparatus that can be used where determinations must be made from specimens that are available only in small volume as, for example, specimens of babies' blood; and to provide processes and apparatus by which it is possible to obtain, along with speed of determination, a degree of accuracy and reliability that is as great as and in many cases greater than that which is possible by the conventional practices heretofore employed.

Other objects and advantages of the invention will be apparent from the description which follows and from the accompanying drawings, in which:

Figure 2 is a perspective of the housing that encloses most of the major components, parts of the housing being broken away to show the interior;

Figure 3 is a diagrammatic representation of a system for use with the apparatus of Figures 1 and 2 for analyzing body fluids for sugars such as glucose;

Figure 4 is a diagrammatic representation of a similar system for analyzing body fluids for urea, ammonia and related compounds having a high nitrogen content;

Figure 5 is a diagrammatic representation of a combined system adapted for both sugar analysis and urea analysis, such combined system having the features of each of the systems of Figures 3 and 4;

Figure 6 is a plan of the type of pump preferably used in the apparatus;

Figure 7 is a section with parts in elevation of the flow cell and the mechanism by which it is mounted and adjusted in the apparatus; and Figure 8 is a plan of the parts appearing in Figure 7.

Figure 1:
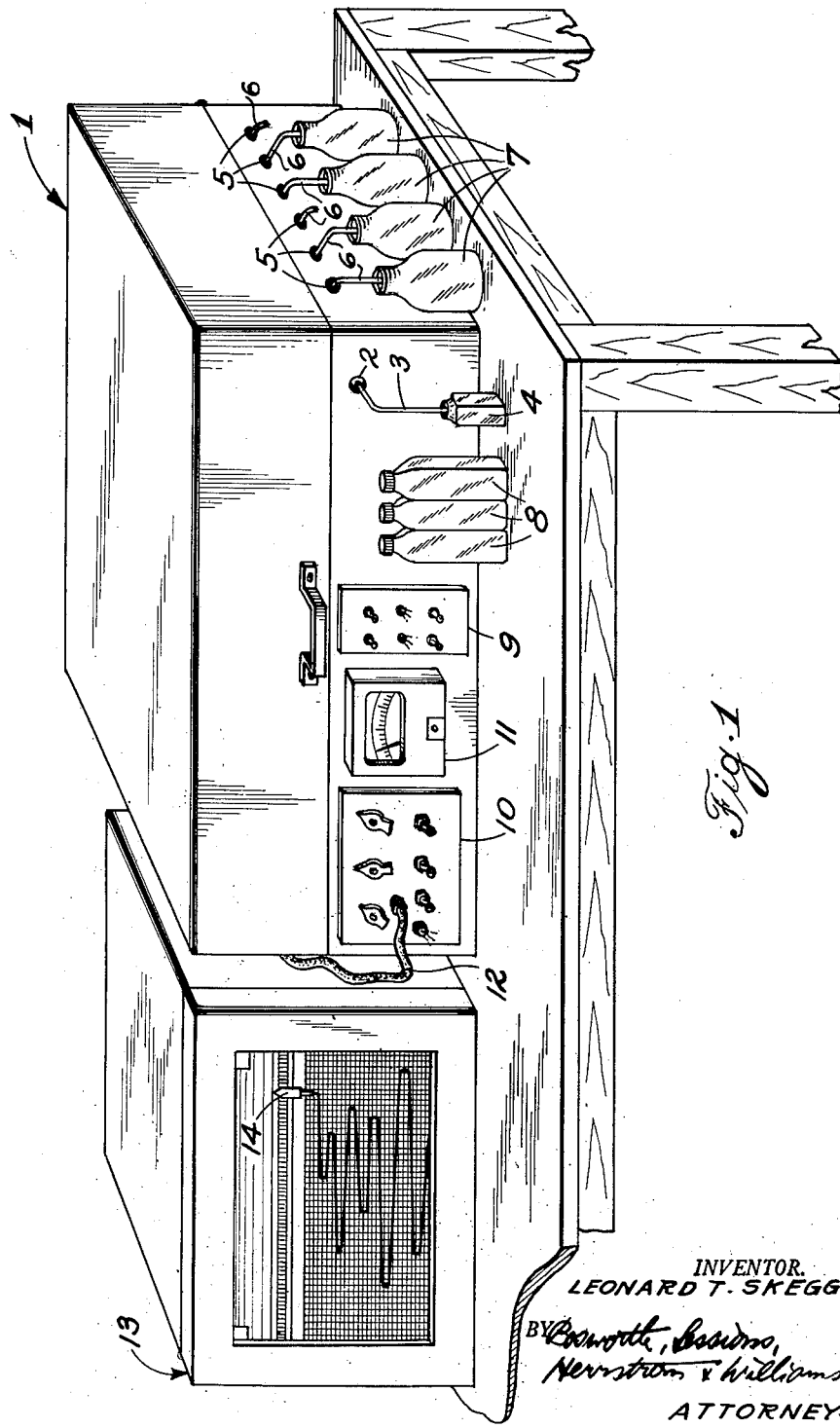
Figure 1 is a perspective of apparatus of the type to which the invention relates.

Referring first to Figure 1, the housing 1 contains those parts of the apparatus requiring the maximum protection against damage. As therein shown, housing 1 has on the near side thereof an opening 2 for a fluid line 3 that leads from a sample bottle 4 containing, usually in undiluted form, a specimen of the body fluid to be analyzed for glucose, urea or the like. Along one end of housing 1 is a series of openings 5 for a corresponding number of fluid lines 6, certain but not all of which lead from bottles 7 containing liquid processing media such, for example, as water, an aqueous solution of potassium ferricyanide, an aqueous solution of urease, and a modified form of Nesslar's reagent. Also shown in Figure 1 is a series of bottles 8 containing, for purposes of comparison, calibration, etc., standard aqueous solutions or specimens of body fluids of known concentrations of glucose, urea, etc.

A control panel 9 is provided on the near side of housing 1 for switches and other controls for electrical circuits for the pump motor, immersion heaters, etc. A separate control panel 10 is provided for a photometric system that is largely contained within housing 1. Shown on the near side of housing 1 is a meter 11 by which the electrical values obtained by use of the photometric system may be read off directly, if desired. A cable 12 leads from control panel 11 to a conventional recorder 13 provided with means 14 for graphically recording the electrical values developed in the photometric system.

As appears from Figure 2, a motor-driven pump 21, a speed reducer 22 and an electric motor 23 occupy one end of housing 1. The pump 21, although shown as a pump of the preferred type, may be any type of pump adapted for the proportional pumping at constant rates of the sample and the processing media. In the embodiment of the invention illustrated in Figures 2 and 6, the pump is one in which a plurality of parallel metal fingers actuated by a cam and cam shaft rotating at 18 R. P. M. press consecutively against a section of a highly flexible tubing of small diameter; e. g., catheter tubing having an internal diameter of 1/32" or 1/16", thus progressively moving through the tubing the material that is being pumped. Finger pumps of this type are available on the market under the trade-mark "Sigmamotor."

Ordinarily, such pumps operate at from 30 to 500

R. P. M. on a single section or on two sections of tubing of relatively large internal diameter: e. g., ¼" to ½". For the purposes of the present invention, it is sufficient to operate the pump 21 at the lower rate of 18 R. P. M. It is desirable that the pump operate simultaneously, as indicated in Figure 2, on each of a number of sections of small-diameter tubing. The number of sections corresponds to the number of lines through which primary and secondary processing media and other fluids are to be drawn into housing 1. As appears from Figure 2, the several lines for the fluids being drawn into housing 1, seven in the apparatus shown, pass in parallel relation to each other through pump 21.

Certain, but not necessarily all, of these fluid lines lead to the platen-type dialyzer 24 shown in Figure 2. Dialyzer 24 is made of two similar half members 25 and 26 that are separated by a semi-permeable pellicle 27 which may be of cellophane, parchment, animal membrane, etc. The two half members 25 and 26 are held together in any convenient manner as by thumb screws (not shown). Each half member is provided with a tortuous passage of shallow depth (0.030") having a counterpart passage on the opposite side of pellicle 27 in the other half member. The connections by which the fluid being pumped are admitted to and discharged from the dialyzer 24 are indicated at 25a, 26a and 25b and 26b respectively.

A solution containing both crystalloids and colloids that is admitted in the form of a flowing stream to the half member on one side of pellicle 27 can, by dialysis, be at least partially freed of its soluble crystalline constituents by virtue of their tendency to diffuse through pellicle 27 into a flowing stream in the half member on the opposite side of the pellicle. On the other hand, colloidal substances, even though present in the same fluid mixture, will remain behind. Thus the proteinous constituents of body fluids, which are of the nature of colloids, will not pass through pellicle 27, but glucose and other crystalloids will diffuse through it into the flowing stream on the opposite side. At the same time, there is a tendency for the liquid into which the crystalloids are being diffused to pass through pellicle 27 in the opposite direction by a process of endosmosis.

Located near dialyzer 24 in housing 1 is a water bath 28 provided with fluid connections 28a and 28b through which, under suitable circumstances, the flowing stream containing the diagnostically significant factor is passed before it enters or after it leaves dialyzer 24. There may be only one such bath or a plurality of such baths, depending on the processing system that is employed. In a typical case, water bath 28 will have a coil 29 of glass, plastic or metal through which the flowing stream is passed and, in proximity to coil 29, an immersion heater 30 controlled by a thermostat (not shown) for maintaining the water bath 28 at a constant temperature. The latter may be between a temperature that is only moderately above ordinary room temperatures and a temperature approaching the boiling point of water.

Elsewhere in housing 1 are the other components of the apparatus, including the photometric system. The operation of the latter will be apparent from what is brought out hereinafter, but for the present purposes it may be noted that parts of it are enclosed within a light-tight sub-housing 31 in which is a light source 32. Partitions 31a, 31b and 31c, which appear in Figure 7, serve among other things to separate certain of the optical elements of the photometric system from each other. Obviously, the arrangement of the various components within housing 1 may be varied over a wide range, depending in part on the needs of the processing system incorporated in the housing. This, in turn, is determined by such considerations as whether the processing system is to be one for analyzing for glucose, one for analyzing for urea, or one equally adapted to analyze for both.

The invention, however, is not confined to processing systems adapted to analyze for sugars such as glucose, for nitrogenous compounds such as urea, or for both in one and the same apparatus, but with appropriate adaptations may be used for analyzing for metals and other components, constituents and factors of body fluids capable of being continuously separated, processed and evaluated.

In a simple situation in which the system and apparatus are designed for the analysis of glucose in blood or other body fluids, the system and apparatus may be organized and arranged as represented in Figure 3. As there indicated, a container 41 holding a suitable quantity of blood or other body fluid, diluted if desired but usually undiluted, constitutes the source of supply of the material to be analyzed. The latter is drawn through a fluid line 42 provided with a shut-off valve V. Container 41 and fluid line 42 correspond to the container 4 and fluid line 3 appearing in Figure 1 on the near side of housing 1. The housing itself is not shown in Figure 3, being omitted for convenience in representation.

A container 43, corresponding to one of the containers 7 shown in Figure 1 at the right-hand end of housing 1, contains an aqueous solution of sodium chloride (saline solution). This solution, which may be described as a primary processing medium, is drawn into the interior of the housing by a line 44 provided with a valve V. Lines 42 and 44 are connected by a suitable fitting so that the substances drawn into them from containers 41 and 43, respectively, may mix and proceed thence through the common lines 45 and 47.

The common line 47 is provided with a valve 48 located in proximity to dialyzer 24. A mixture of the fluids in lines 45 and 46 is fed by means of line 47 to the upper half 25 of the dialyzer. Line 46, which is provided with a valve V, is employed to introduce a different primary processing medium; viz., atmospheric air. No container at the outer end of the line 46 is necessary where line 46 is used in this manner and therefore none is shown in Figure 3. The air thus introduced into line 46 by the pump 21 concomitantly with the flow of the liquids into lines 42 and 44 flows with the latter in tube 47 to the dialyzer and in tube 47 the air divides the fluid stream into a segmented fluid stream composed of alternate segments of liquid and air. It will be understood that in the course of the travel of this segmented fluid stream through tube 47, the segments of air displace liquid from the inner surface of the tube so as to prevent or substantially reduce the mixing of the samples with each other and hence prevent the contamination of one sample by another in the operation of the machine for analyzing a series of samples. It will also be understood that the air segments in the segmented fluid stream which flows through the dialyzer at one side of the pellicle or diaphragm 27 likewise displaces liquid from the surfaces which define the tortuous fluid path hereinbefore referred to, and thus prevents mixing of different samples in the dialyzer.

As further indicated in Figure 3, the metal fingers 57 of pump 21 operate simultaneously on lines 42, 44 and 46, all of which are of rubber, neoprene, polyethylene or a similar flexible material. The fingers 57 are actuated by a cam 58 and cam shaft 59 driven by suitable mechanisms (not shown) from speed reducer 22 and motor 23. By pressing against lines 42, 44 and 46, fingers 57 continuously draw fluids into the system at constant rates and urge a mixture of such fluids into dialyzer 24, likewise at a constant rate. The quantities are dependent on the size or sizes and number of sections of tubing but are necessarily proportional to each other.

In upper half 25 of dialyzer 24 the mixture follows a tortuous path in constant contact with pellicle 27. During this time, the glucose, which is a soluble crystalloid, diffuses through pellicle 27 in proportion to its concentration in the mixture that is being fed to dialyzer 24 by common line 47. What remains dispersed in the mixture after the glucose has been extracted consists in the main of proteinous colloids and like materials that cannot pass through pellicle 27. They are discharged by line 49 from the upper half 25 of dialyzer 24 and discarded.

Simultaneously, the lower half 26 of dialyzer 24 is supplied with a continuous stream of a secondary processing medium. The latter may be taken from a source such as container 51 which holds an aqueous solution of potassium ferricyanide. It is drawn into the system by means of a fluid line 52 provided with a valve V. A similar container 53 and a similar fluid line 54, likewise provided with a valve V, may be used if (as is true in the case of potassium ferricyanide) it is desired to feed into the system a greater quantity of a given processing medium than it is possible to supply by means of a single line. Air is drawn into the system through a line 55.

The pump fingers 57 operate as previously described on lines 52, 54 and 55, urging a mixture of air and an aqueous solution of potassium ferricyanide through the common line 56 into the lower half 26 of dialyzer 24. In dialyzer 24, the mixture picks up the glucose that diffuses through pellicle 27, but without losing any substantial part of its content of potassium ferricyanide. After the glucose has been introduced into the mixture in the course of its travel through the tortuous path in the lower half 26 of dialyzer 24, the resulting mixture or liquid diffusate passes out of dialyzer 24 by a fluid line 61 provided with a valve 62. It will be observed that, as in the case of the air which is introduced by the pump into the stream flowing in tube 47, as hereinbefore described, the air which is introduced by the pump into tube 56 forms a segmented fluid stream which is composed of alternate segments of liquid and air and that the segmented flowing stream passes through the tortuous path of the dialyzer from which the liquid diffusate flows into the outlet tube 61, and the segmented liquid stream continues to flow in this fashion, that is as a segmented fluid stream, until it reaches the flow cell 71 of the colorimeter hereinafter more particularly referred to. Thus, the tubular means or conductors for the fluid streams are continually subjected to the cleaning action of the air segments, namely the displacement by the air segments of liquid from the inner surfaces of the tubular means or liquid conductors.

The mixture then proceeds to a coil 63 in a water bath 64 heated by means of an immersion heater 65 that is connected to an electric circuit leading to a switch on control panel 9. The water in water bath 64 is preferably maintained at a temperature equalling or closely approaching that of boiling water, in which case no thermostat will be required. In its travel through coil 63, the mixture discharged from lower half 26 of dialyzer 24 by way of fluid line 61 undergoes a chemical change, any glucose acting to reduce the potassium ferricyanide to potassium ferrocyanide. Potassium ferricyanide in solution in unreduced form is yellow in color; after its reduction to ferrocyanide, its solution is colorless. If, therefore, glucose is present in the test sample being analyzed, there will be a proportionate reduction of the potassium ferricyanide in coil 63 with an accompanying loss of color.

Thus water bath 64 serves to develop in the mixture a degree of color, different from that of a solution of unreduced potassium ferricyanide, on the basis of which it is possible to make the photometric examination hereinafter described. However, before subjecting the mixture to such examination, it is desirable to bring it to room temperature. To this end, the mixture discharged from coil 63 is exposed to the action of a current of air by passing it through a second coil 66 in a sleeve 67 that is coupled to a fan-equipped air blower 68. As a result, the mixture discharged from coil 66 by means of fluid line 69 is at a temperature only slightly, if at all, above ordinary room temperatures.

As indicated in Figure 3, the mixture, still in the form of a flowing stream, then passes into a fluid line 70 leading to a transparent plastic flow cell 71 provided with an open chamber 72 and mounted on brackets 71a as shown in Figure 7. A communicating duct 73 leads from the lower end of open chamber 72 to a horizontal cylindrical passage 74. The latter is in alignment with a beam of light B from light source 32, which beam enters flow cell 71 as indicated in Figures 3 and 7. An optically transparent plug 75 closes one end of cylindrical passage 74 against the escape of fluid but permits light beam B to pass out of flow cell 71 as indicated in the drawings.

An optically transparent plunger 76, operated by means of a hand wheel as hereinafter explained, is mounted for sliding movement in cylindrical passage 74. The possibility of effecting such movement of plunger 76 whenever desired permits the length of the path of travel of the light beam B through the fluid mixture in cylindrical passage 74 to be increased or decreased at will. The fluid mixture, which continuously travels out of flow cell 71 by means of a duct 77 connected to a waste line 78, fills chamber 74 regardless of the position of plunger 76. In order to prevent syphoning, waste line 78 is interrupted and equipped with a funnel 78a as indicated in Figures 7 and 8, particularly the former.

The manner in which flow cell 71 is mounted and adjusted in sub-housing 31 is apparent from Figures 7 and 8. Plunger 76, through which light beam B passes, is held firmly in place in a surrounding metal sleeve 79 by a liquid-tight press fit or in any other suitable way. Sleeve 79 is itself slidably mounted in a rearwardly projecting sleeve-like extension 80 that is formed integrally with flow cell 71. A bracket 81 provided with a set screw 81a locates extension 80 in the desired position. Bracket 81 is mounted on partition 31b by screws (Figure 8). It is so shaped as to enable it to accommodate one or more fibre washers 82 by means of which any part of the fluid mixture escaping around plunger 76 and over sleeve 79 is denied entry to those parts of the optical system that lie to the right of partition 31b as seen in Figures 7 and 8.

The latter parts include an exteriorly flanged and threaded mounting sleeve 83 rigidly held to partition 31b as by screws (Figures 7 and 8). It will be noted that mounting sleeve 83 is provided at 83a with a keyway. On its threaded exterior surface it supports an interiorly flanged and threaded hand wheel 84. As shown in Figure 7, the latter has a transversely extending circular flange 84a which encompasses but does not have threaded engagement with the threaded outer surface of a slidably mounted horizontal optical tube 85. The latter, which is of metal, includes a fixed hollow plug 85a for firmly holding the proximate end of metal sleeve 79 and, at its other end, a fixed hollow plug 85b provided with a lens for condensing the light from light source 32. Both plugs are of metal. On its exterior surface, optical tube 85 is provided with a key 85c which slides in keyway 83a in mounting sleeve 83.

Threaded metal rings 86, of which there is one on each side of flange 84a of hand wheel 84, loosely confine hand wheel 84 and hold it to optical tube 85 in such manner that the two can move together axially of the assembly as a whole; accordingly, rotary movement of hand wheel 84 results in sliding movement of optical tube 85. By rotating hand wheel 84, therefore, optical tube 85, metal sleeve 79 and plunger 76 can be adjusted toward or away from optical plug 75 in flow cell 71, correspondingly decreasing or increasing the length of the path of light beam B in flow cell 71. The means making possible this adjustment, which is provided partly for purposes of calibration, may be omitted if desired. Once the apparatus has been properly calibrated, the absorption of light in cylindrical passage 74 provides a measure by which the concentration of the diagnostically significant factor in the unknown sample may be ascertained.

Optical tube 85 also carries a rectangular plate 87 held in place on optical tube 85 by means of a threaded retaining ring 88. Plate 87 forms part of a shielding system for light source 32 and as shown is provided with a removable top 87a. If desired, the shielding may be more extensive than is indicated in Figure 7, as by the use of additional shielding elements supported, for example, from partition 31a. Light source 32, which takes the form of an incandescent light bulb, is held in place by means of two adjustable brackets 89a and 89b (Figure 8). As is apparent from Figure 7, there is provision for sliding contact between the receptacle for the end of light bulb 32 and bracket 89b, thus permitting light bulb 32 to move to the left or right, as the case may be, in response to movement of optical tube 85.

By these or similar means, light emanating from light source 32 will be confined and caused to pass through hollow plug 85b at the righthand end of optical tube 85 as seen in Figure 7. The light is condensed therein by the convex condensing lens at the outer end of hollow plug 85b. Any light entering optical tube 85 passes out through metal sleeve 79, which is preferably provided with a collimating slit (not shown) in alignment with the optically transparent plunger 76. Light penetrating plunger 76; i. e., light beam B, passes through plug 75 in flow cell 71 to the colored filter 90 which, for the purposes of the system shown in Figure 3, is preferably of violet glass having its maximum transmission at 415 millimicrons. It proceeds thence to a photo-electric cell ("photo tube"), an amplifier, the meter 11, and the recorder 13.

The parts of the photometric system include the previously mentioned colored filter 90, the photo-electric cell, the amplifier, the meter 11 and the recorder 13. These parts are conventional. They are arranged as shown in a manner well understood in the field of spectrophotometry. Their operation depends on the fact that where the fluid mixture passing through cylindrical passage 74 is colored, its light-absorption characteristics and therefore its light-transmitting characteristics are different from those of a colorless solution or a more highly colored solution, as a result of which the photoelectric cell is affected in a greater or lesser degree. The current developed in the photoelectric cell, amplified to suit the needs of the installation, constitutes the response produced by the apparatus as a whole.

As is well known, the optical density of a solution is a linear function of the concentration of a colored solute (Beer's law). Optical density, however, is a logarithmic function of the current output of a phototube-amplifier. The scale of the meter 11 or recorder 13 can therefore be logarithmically divided to provide direct readings of optical density. These readings are then linearly related to the concentration of the colored compound and significant factor. In order to have direct readings in milligrams per 100 ml. of solution, it is necessary (as presently understood) to have an adjustable cell length. The cell length adjustment makes it possible to adjust the response of the machine so that a given known standard solution falls on the proper place on a precalibrated scale on the meter 11 or on the recorder 13. An unknown solution can then be read directly from the scale without any calculations.

Where the response to a standard solution is known from a scale that is not in and of itself direct reading, the departure from that response which is obtained where an unknown sample is being drawn from container 41 of course provides an index as to the concentration of the diagnostically significant factor, this even if direct-reading scales are not available. If, for example, a standard solution containing a known amount of glucose results in a given response in the photometric system, the response from an unknown sample will be greater or less depending on whether the glucose content of the test sample is more or less than that of the standard solution. The relative concentration of the diagnostically significant factor in the unknown sample may, therefore, be observed and calculated with a high degree of accuracy in the absence of direct-reading scales such as those described in the preceding paragraph.

In so much of the foregoing description as relates to the system shown in Figure 3, reference has already been made to the saline solution and to the solution of potassium ferricyanide. The concentrations of these solutions may vary over a considerable range. For the former it has been found best to use a 0.9% aqueous solution of ordinary sodium chloride. For the latter it has been found best to use the aqueous solution obtained by adding 15 ml. of 5 N sodium hydroxide and 4.5 ml. of 5% potassium ferricyanide that is free of ferrocyanide ions to the solution that results from dissolving 300 gms. of sodium chloride and 10 gms. of anhydrous sodium carbonate in enough water to make one liter.

The sodium carbonate and sodium hydroxide are used to give the alkaline reaction necessary when potassium ferricyanide is to be reduced by glucose or a similar sugar. The sodium chloride is used in order to decrease the vapor pressure when the mixture is passed through the water bath, which, as noted above, is maintained at approximately the temperature of boiling water. The solution of potassium ferricyanide obtained as described should be protected from light, which tends to produce undesirable reactions in the solution.

In using the apparatus, the operator may, if he desires, start samples through the machine at intervals of one or two minutes. Between successive samples, the operator will ordinarily allow air to be drawn into the system through lines 46 and 55, thus establishing visible limits for the samples and preventing them from mixing with each other. If the lines are of sizes of the order of those previously mentioned; e. g., 1/32" to 1/16", the air so introduced does not itself mix with the preceding and following samples but passes in bubble-like formation through the apparatus. The samples themselves need not be large, being in typical cases as small as and even smaller than one cubic centimeter in volume. By contrast with the air bubbles, they appear as continuous columns of liquid both before and after mixing with the various processing media. Where one sample ends and another begins is something that the operator can readily observe both visually and from the action of meter 11 and recorder 13.

In the system shown in Figure 4, the sample bottle 91, which corresponds to the bottle 4 shown in Figure 1 on the near side of housing 1, may contain, for example, highly uremic blood that has been suitably diluted with water. As the result of the action of pump 21, of which the fingers 57 are actuated by a cam 58 on a camshaft 59, the mixture is picked up by a fluid line 92 provided with a shut-off valve V. Simultaneously, a buffer solution is drawn from container 93 through fluid line 94, and a solution of urease is drawn from container 95 through fluid line 96, each line incorporating a valve V. The liquids so drawn from containers 91, 93 and 95 by way of flexible lines 92, 94 and 96, constituting the sample and two primary processing media, pass into and are mixed in a common line 97. They proceed thence into the coil 98 of a water bath 99 that is preferably maintained by a thermostat (not shown) at a constant temperature of 55° C. The water bath 99, which is heated by an immersion heater 101, is provided in order to increase the reactivity of the urease toward the urea.

In water bath 99, the urease, which is an enzyme, acts on the urea in the blood sample being drawn from container 91 to convert the urea to an ammonium salt, probably ammonium carbonate. The solution of the ammonium salt obtained as a result of this enzymatic reaction leaves water bath 99 by means of a fluid line 102 provided with a valve V, designated 103 in Figure 4, and then enters the upper half 25 of dialyzer 24. In dialyzer 24 the ammonium carbonate or other ammonium salt derived from the urea is diffused through the pellicle 27 in direct proportion to the quantity of urea present in the blood sample in container 91. What remains, principally a dispersion of proteinous colloids and other non-diffusable constituents of the blood sample, leaves the upper half 25 of dialyzer 24 by means of a waste line 104.

At the same time, by the action of fingers 57 of pump 21, secondary processing media in the form of water and air are drawn into the system and fed to the lower half 26 of dialyzer 24. Air enters by means of fluid lines 107 and 108, each of which is provided with a valve V. Water in a container 105 is drawn into the system by a fluid line 106, likewise provided with a valve V. The air and water so introduced into the system are mixed with each other in a common line 109 by which they travel, in the form of a segmented fluid stream composed of alternate liquid and air segments to the lower half 26 of dialyzer 24. In the latter, the mixture picks up the ammonium salt which diffuses through pellicle 27. The resulting mixture leaves the lower half 26 of dialyzer 24 by means of a line 110 provided with a valve V, designated 111, and proceeds thence to a reaction tube 112.

Simultaneously, likewise by the operation of fingers 57 of pump 21, another secondary processing medium in the form of Nesslar's reagent is drawn into the system from a container 114 through a fluid line 115 provided with a valve V. It discharges from fluid line 115 directly into reaction tube 112. The latter, which introduces a delay stage, is the color development tube in the system of Figure 4. From reaction tube 112, the mixture is continuously discharged by way of discharge connection 113 and line 70 into flow cell 71. Together with the other parts of the photometric system, flow cell 71 operates as in the embodiment of the invention illustrated in Figure 3. All components bearing the same legends or reference characters in Figures 3 and 4 are the same in both systems except that in the system of Figure 4 the colored filter 90 is preferably of blue glass having its maximum transmission at 460 millimicrons.

The solutions of urease that are commercially available at the present time contain substances that diffuse through pellicle 27 and interfere with the action of Nesslar's reagent. Accordingly, it is desirable to prepare a concentrated stock solution of urease, as by stirring 250 gms. of well ground Jack Bean meal with one liter of distilled water for one hour, refrigerating until all coarse particles have settled out, and decanting the supernatant liquid. The latter, which is cloudy on decantation, is clarified in a centrifuge or by filtration. The clarified solution is then dialyzed against a saline solution until the saline solution no longer picks up from it any substances interfering with the action of Nesslar's reagent. What remains thereafter is evaporated to a thick paste under vacuum at temperatures less than 40° C., by which time the volume should be of the order of about 33 ml. Sufficient glycerol is then added to bring the volume to 100 ml.

Optionally, the clear fraction or filtrate from the Jack Bean meal may be partially evaporated prior to dialysis and the evaporation to a paste completed after dialysis.

The proper dilution of the concentrated stock solution of urease before use is made of it is something that should be determined for each batch that is prepared. Preferably, a series of sample dilutions of the concentrated stock solution is made by dissolving like amounts in different quantities of water. These are tested in the apparatus and use is made of the weakest one that gives identical response when used with solutions of urea and ammonia of comparable nitrogen content. Usually, a 50 to 1 dilution of the concentrated solution of urease gives complete conversion of the urea to the ammonium salt or salts.

The buffer solution drawn from container 93 is made by dissolving the following in enough water to give a volume of one liter: 13.6 gms. of potassium di-hydrogen phosphate, 34 ml. of 2.5 N sodium hydroxide, and 200 gms. of sodium chloride. The pH of this solution is approximately 7.6, which is close to the optimum hydrogen ion concentration for the urease enzyme. The sodium chloride serves to increase the rate of dialysis of the ammonium ion by a factor of 2 to 2.5 times, this increase in rate being somewhat larger in the case of simple aqueous solutions than in the case of blood. Using a correction factor of 0.95, it becomes possible to compare aqueous solutions of urea with blood, uremic or otherwise.

Nesslar's reagent is an alkaline solution of the double iodide of mercury and potassium ($HgI_2 \cdot 2KI$). With ammonia it forms a yellow-red compound which, under suitable conditions, will remain in solution, thus permitting a colorimetric measurement to be made. The commercially available form of Nesslar's reagent, which is usually made according to the well-known method of Folin and Wu, may be used in the process and apparatus of the present invention. The modification made according to the method of Koch and McMeekin (Journal of the American Chemical Society 46, 2066) is also useful. These reagents are usually employed after dilution with 9 volumes of a suitable diluent; however, in the apparatus of the present invention, the best response is obtained when the initial dilution is of the order of 2.5 to 1. Water introduced into dialyzer 24 by way of fluid lines 106 and 109 serves to dilute the reagent further, so that the final degree of dilution is 5 to 1 instead of 10 to 1 as in conventional practice.

The method employed with the apparatus of Figure 4 actually determines not only urea but ammonia as well. As to them it is very specific. Since the ammonia content of blood is negligible, the method as applied to blood is virtually specific for urea. As applied to urine, in which there is an appreciable concentration of ammonia, the method determines both ammonia and urea. In practice, the ammonia nitrogen of urine is usually assumed to be present in low, reasonably constant ratio to the urea nitrogen; therefore, analyses for urea are sometimes corrected for the presence of ammonia by use of an arbitrary factor. If desired, the present method can be used to determine urinary ammonia by eliminating use of the urease and using the results so obtained to correct the usual analysis using urease, which, as noted, gives the total values of the urea and ammonia. The difference would represent the urea content of the sample.

In the form of the invention illustrated in Figure 5, which represents a system equally adapted to take samples containing either glucose or urea, those parts of the system which correspond to parts of the systems illustrated in Figures 3 and 4 in general carry the same reference characters and legends as in Figures 3 and 4. Where, however, there is a departure from what is there disclosed, the reference characters are usually different. In general, the similarity is the greatest in respect of such components as the dialyzer, water baths and photometric system. Whereas in Figures 3 and 4 all of the various shut-off valves are designated V, in Figure 5 the valves are designated V' and V", depending on whether they are one-way or two-way valves.

As indicated in Figure 5, a sample containing glucose or urea or some other diagnostically significant factor is supplied from a container 41 by means of a line 42 provided with a valve V'. As in Figure 3, the containers 43, 51 and 53, by means of lines 44, 52 and 54, supply the saline solution and the solution of potassium ferricyanide. Air is supplied by lines 46 and 55, the latter being provided with a valve V'. Each of lines 44, 46, and 52 and 54 includes a two-way valve V" which, as will appear, is provided in order that the operator of the apparatus may, if he desires, switch from an analysis for glucose to an analysis for urea.

Also present in the system in addition to the components so far mentioned are components that have their counterparts in the embodiment of the invention illustrated in Figure 4; namely, container 93 for buffer solution, container 95 for urease solution, container 105 for water, and container 114 for Nesslar's reagent. These containers, by means of lines 94, 96, 106 and 115, respectively, communicate with the two-way valves V'', which permit the liquid processing media to be drawn, if desired, from containers 43, 51 and 53 or, alternatively, from containers 93, 95, 105 and 114. Air line 108 appears in the same relationship to the other components as in Figure 4, but in Figure 5 air line 55 takes the place of air line 107.

Further reference to Figure 5 will show that the two-way valve 121 controls the flow into common line 122 and that the contents of lines 42 and 122 flow together into common line 123. Two-way valve 124 controls the flow of air from air line 46 and, alternatively, the flow of urease solution through line 96. The common line serving the mixture of the two is designated 125. Where common lines 123 and 125 join to form the single line 126, the fluids in the two lines mix, common line 126 carrying the resulting mixture into the apparatus.

The two-way valve designated 127 permits the mixtures of processing media and sample to be directed to dialyzer 24 by either one of two alternative routes. One of these, for use where the sample is being analyzed for glucose, is through line 128, through two-way valve 132, and thence through line 133 leading to upper half 25 of dialyzer 24; the other, for use where the analysis is for urea, is through line 129, through coil 98 in the low-temperature water bath 99, and thence through line 131, two-way valve 132 and line 133. Whatever the nature of the mixture of processing media and sample, which depends on the nature of the diagnostically significant factor for which the analysis is being made, what remains after the diagnostically significant factor has been removed in dialyzer 24 is discarded through line 134.

If the analysis that is being made is for glucose, potassium ferricyanide solution is drawn from containers 51 and 53 through lines 52 and 54, through two-way valves 136 and 138, and through lines 137 and 139. Simultaneously, air is drawn into the system by way of air line 55. The mixture that results where lines 55, 137 and 139 meet is fed by way of common line 141 to the lower half 26 of dialyzer 24, whence it passes by means of line 142 into the two-way valve 143 and through it to line 144. It proceeds thence to the high-temperature water bath 64, in which it is heated to a temperature equal to or approaching that of boiling water. After passing through cooling coil 66, the mixture passes through lines 69, 145 and 70a to flow cell 71.

If, however, the analysis that is being made is not for glucose but for urea, the mixture fed to lower half 26 of dialyzer 24 by way of common line 141 consists of water from container 105 and air from air lines 55 and 108. After having passed through the lower half 26 of dialyzer 24, this mixture, which now includes the ammonium salt derived from the urea in the sample, passes through line 142, two-way valve 143 and line 146 into reaction tube 112. Simultaneously, Nesslar's reagent from container 114 is admitted to reaction tube 112 by way of line 115. The final mixture, which is colored, passes into flow cell 71 by way of discharge connection 113 from reaction tube 112 and the line 70b.

In the system illustrated in Figure 5, as in that illustrated in Figure 4, there must, therefore, be a minimum of seven flexible lines on which pump 21 can operate by means of pump fingers 57, cam 58 and cam shaft 59. With seven lines arranged as shown, the operator can switch from glucose to urea or vice versa by opening or closing one-way valves V' and setting two-way valves V'' as indicated by the foregoing description. Thus the apparatus can be operated like the system shown in Figure 3, wherein the analysis is for glucose, or like the system shown in Figure 4, wherein the analysis is for urea.

By suitable adaptation, the analysis to be made may be for other constituents of blood, urine and like body fluids; for example, the metallic constituents. The system as a whole is susceptible of wide variation from the standpoint of the apparatus, from the standpoint of the procedural steps that are carried out in making the analysis, and from the standpoint of the sample that is being analyzed, which may be almost any body fluid, including whole blood that contains an added anti-coagulant, blood plasma, blood serum, cerebro-spinal fluid, and urine, diluted or undiluted. The reagents are not limited to those described, but will naturally conform to the needs of the situation, depending on the type of analysis that is being run.

It is intended that the patent shall cover, by summarization in appended claims, all features of patentable novelty that reside in the invention.

What is claimed is:

1. Apparatus for the analysis of a liquid containing crystalloid and non-crystalloid constituents for obtaining a quantitative indication of a crystalloid substance therein, comprising a dialyzer having a diaphragm and an inlet and outlet at the same side of said diaphragm and having at the other side of said diaphragm an inlet for a liquid to receive crystalloid diffusate from the liquid under analysis, and having at said other side of the diaphragm an outlet for the liquid containing said diffusate, means for flowing a stream of said first mentioned liquid through said dialyzer at said first mentioned side thereof whereby a portion of the crystalloid constituent of the liquid stream in proportion to the crystalloid constituent of the liquid to be analyzed is diffused into the liquid at said other side of the dialyzer, tubular means connected to said inlets for conducting said liquids, respectively, to said dialyzer, and means operable to introduce air into said tubular means during the flow of said liquids therein thereby forming in said tubular means streams of fluid formed of alternate segments of liquid and air whereby to provide segmented streams of air to displace liquid from the inner surfaces of said tubular means during the flow of the segmented liquid streams therethrough.

2. Apparatus for the analysis of a liquid containing crystalloid and non-crystalloid constituents for obtaining a quantitative indication of a crystalloid substance therein, comprising a dialyzer having a diaphragm and an inlet and an outlet at the same side of said diaphragm and having at the other side of said diaphragm an inlet for a liquid to receive crystalloid diffusate from the liquid under analysis, and having at said other side of the diaphragm an outlet for the liquid containing said diffusate, means for flowing a stream of said first mentioned liquid through said dialyzer at said first mentioned side thereof whereby a portion of the crystalloid constituent of the liquid stream in proportion to the crystalloid constituent of the liquid to be analyzed is diffused into the liquid at said other side of the dialyzer, and means for quantitatively indicating said crystalloid substance in the separated crystalloid constituent for providing a quantitative indication of said crystalloid substance in the liquid under analysis, tubular means connected to said inlets for conducting said liquids, respectively, to said dialyzer, and means operable to introduce air into said tubular means during the flow of said liquids therein thereby forming in said tubular means streams of fluid formed of alternate segments of liquid and air whereby to provide segmented streams of air to displace liquid from the inner surfaces of said tubular means during the flow of the segmented liquid streams therethrough.

3. Apparatus for analyzing a liquid containing crystalloid and non-crystalloid constituents to obtain a quantitative indication of a substance contained in said crystalloid constituent, comprising means for forming a flowing stream of said liquid, means through which said stream flows for separating from said flowing stream said crystalloid constituent thereof in proportion to the quantity thereof in the liquid to be analyzed, said stream-forming means comprising tubular means for conducting said flowing stream of liquid to said separating means, and means operable to introduce air into said tubular means during the flow of liquid therein thereby forming in said tubular means a stream of fluid formed of alternate segments of liquid and air to provide a segmented stream of air to displace liquid from the inner surfaces of said tubular means during the flow of the segmented liquid streams therethrough.

4. Apparatus for analyzing a liquid containing crystalloid and non-crystalloid constituents to obtain a quantitative indication of a substance contained in said crystalloid constituent, comprising means for forming a flowing stream of said liquid, means in the path of flow of said stream for separating from said flowing stream a portion of said crystalloid constituent thereof from said non-crystalloid constituent in proportion to the quantity thereof in the liquid to be analyzed, means for forming a second liquid stream flowing concurrently with said first stream in a path to intercept and mix with the separated portion of said crystalloid substance, and means in the path of flow of the second stream for analyzing said second stream.

5. Apparatus for analyzing a liquid containing crystalloid and non-crystalloid constituents to obtain a quantitative indication of a substance contained in said crystalloid constituent, comprising means for forming a flowing stream of said liquid, means through which said stream flows for separating from said flowing stream said crystalloid constituent thereof in proportion to the quantity thereof in the liquid to be analyzed, means for forming a second liquid stream flowing concurrently with said first stream and arranged to receive from the latter the separated crystalloid constituent, and means to condition said second stream for colorimetric analysis thereof in respect to said substance, said liquid stream-forming means comprising tubular means for conducting said streams of liquid, respectively, and means operable to introduce air into said tubular means during the flow of said liquids therein thereby forming in said tubular means streams of fluid formed of alternate segments of liquid and air whereby to provide segmented streams of air to displace liquid from the inner surfaces of said tubular means during the flow of the segmented liquid streams therethrough.

6. Apparatus for analyzing a liquid containing crystalloid and non-crystalloid constituents to obtain a quantitative indication of a substance contained in said crystalloid constituent, comprising means for forming a flowing stream of said liquid, means through which said stream flows for separating from said flowing stream said crystalloid constituent thereof in proportion to the quantity thereof in the liquid to be analyzed, means for forming a second liquid stream flowing concurrently with said first stream and arranged to receive from the latter the separated crystalloid constituent, said liquid-stream forming means comprising tubular means for said streams, respectively, and pump means for pumping the liquid-streams through said respective tubular means in timed relation, and means including said pumping means for introducing air into said tubular means during the flow of said liquids therein thereby forming in said tubular means streams of fluid formed of alternate segments of liquid and air whereby to provide segmented streams of air to displace liquid from the inner surfaces of said tubular means during the flow of the segmented liquid streams therethrough.

7. Apparatus for analyzing samples of liquids containing crystalloid and non-crystalloid constituents for obtaining a quantitative indication of a crystalloid substance therein, comprising dialyzer means, means to pass the samples and a primary processing fluid in the form of a first flowing stream to one side of said dialyzer means, said dialyzer means being disposed in the path of said stream for separating from the non-crystalloid constituent a portion of the crystalloid constituent in proportion to the quantity thereof in the sample to be analyzed, means to pass a secondary processing fluid in the form of a second flowing stream to the other side of said dialyzer means in a path to intercept and mix with the separated portion of the crystalloid constituent, means in the path of flow of said second stream to treat said second stream to provide color changes therein in proportion to the concentrations of said crystalloid substance in the samples, respectively, a colorimeter in the path of said treated second stream flow and a recorder operable under the control of said colorimeter to provide records quantitatively indicative of said crystalloid substance of the liquid samples, respectively.

8. Apparatus for analyzing liquid samples containing a crystalloid constituent and a non-crystalloid constituent, comprising a dialyzer having a diaphragm and an inlet and an outlet at one side of the diaphragm for the passage of a stream of sample-containing liquid through the dialyzer at said side of the diaphragm, said dialyzer also having an inlet and an outlet at the other side of said diaphragm for the passage of streams of liquid into and out of the dialyzer at said other side of the diaphragm to form a stream of liquid containing the crystalloid substance which is diffused through the diaphragm from said first mentioned side thereof, said inlets and outlets at the opposite sides of the diaphragm being located so that said streams flow in the same direction relative to the diaphragm of the dialyzer, tubes leading to and from the dialyzer for conducting the liquids to and from the dialyzer, and means for introducing air into the tubes leading to the dialyzer for forming segmented streams of fluid composed of alternate segments of liquid and air passing through said tubes and the dialyzer during the flow of said streams.

9. Apparatus for analyzing liquid samples containing a crystalloid constituent and a non-crystalloid constituent, comprising a dialyzer having a diaphragm and an inlet and an outlet at one side of the diaphragm for the passage of a stream of sample-containing liquid through the dialyzer at said side of the diaphragm, said dialyzer also having an inlet and an outlet at the other side of said diaphragm for the passage of streams of liquid into and out of the dialyzer at said other side of the diaphragm to form a stream of liquid containing the crystalloid substance which is diffused through the diaphragm from said first mentioned side thereof, means for treating the liquid of said last mentioned stream for colorimetric analysis thereof, a colorimeter flow-cell to receive the treated liquid, tubes leading to and from the dialyzer for conducting the liquids to and from the dialyzer and to the flow cell, and means for introducing air into the tubes leading to the dialyzer for forming segmented streams of fluid composed of alternate segments of liquid and air passing through said tubes and the dialyzer and through the connections of the latter to said flow cell.

10. Apparatus for analyzing liquid samples containing a crystalloid constituent and a non-crystalloid constituent, comprising a dialyzer having a diaphragm and an inlet and an outlet at one side of the diaphragm for the passage of a stream of sample-containing liquid through the dialyzer at said side of the diaphragm, said dialyzer also having an inlet and an outlet at the other side of said diaphragm for the passage of streams of liquid into and out of the dialyzer at said other side of the diaphragm to form a stream of liquid containing the crystalloid substance which is diffused through the diaphragm from said first mentioned side thereof means for treating the liquid of said last mentioned stream for colorimetric analysis thereof, a colorimeter flow-cell to receive the treated liquid, tubes leading to and from the dialyzer for conducting the liquids to and from the dialyzer and to the flow-cell and means for introducing air into the tubes leading to the dialyzer for forming segmented streams of fluid composed of alternate segments of liquid and air passing through said tubes and the dialyzer and through the connections of the latter to said flow-cell, and a vent for the escape of the air from said stream of treated liquid received in said flow-cell whereby an uninterrupted column of liquid is provided in the cell for colorimetric analysis of said liquid.

11. Apparatus for analyzing liquid samples containing a crystalloid constituent and a non-crystalloid constituent, comprising a dialyzer having a diaphragm and an inlet and an outlet at one side of the diaphragm for the passage of a stream of sample-containing liquid through the dialyzer at said side of the diaphragm, said dialyzer also having an inlet and an outlet at the other side of said diaphragm for the passage of streams of liquid into and out of the dialyzer at said other side of the diaphragm to form a stream of liquid containing the crystalloid substance which is diffused through the diaphragm from said first mentioned side thereof, tubes leading to and from the dialyzer for conducting the liquids to and from the dialyzer and means for introducing air into the tubes leading to the dialyzer for forming segmented streams of fluid composed of alternate segments of liquid and air passing through said tubes and the dialyzer during the flow of said streams, and pump means operable to pump said streams of liquids and said air in predetermined relative volumes and in predeterminend time relation through said dialyzer.

12. Apparatus for analyzing a liquid containing crystalloid and non-crystalloid constituents to obtain a quantitative indication of a substance contained in said crystalloid constituent, comprising means for forming a flowing stream of said liquid, dialyzer means in the path of flow of said stream for separating from said flowing stream, a portion of said crystalloid constituent thereof from said non-crystalloid constituent in proportion to the quantity thereof in the liquid to be analyzed, means for forming a second liquid stream flowing concurrently with said first stream in a path to intercept and mix with the separated portion of said crystalloid substance, and means in the path of flow of the second stream for analyzing said second stream.

13. Apparatus for analyzing a liquid containing crystalloid and non-crystalloid constituents to obtain a quantitative indication of a substance contained in said crystalloid constituent, comprising means for forming a flowing stream of said liquid, dialyzer means in the path of flow of said stream for separating from said flowing stream a portion of said crystalloid constituent thereof from said non-crystalloid constituent in proportion to the quantity thereof in the liquid to be analyzed, means for forming a second liquid stream flowing concurrently with said first stream in a path to intercept and mix with the separated portion of said crystalloid substance, and means in the path of flow of the second stream for analyzing said second stream, said last mentioned means including a colorimeter and a recorder operable under the control of said colorimeter.

14. Apparatus for analyzing a liquid containing crystalloid and non-crystalloid constituents to obtain a quantitative indication of a substance contained in said crystalloid constituent, comprising means for forming a flowing stream of said liquid, means in the path of flow of said stream for separating from said flowing stream a portion of said crystalloid constituent thereof from said non-crystalloid constituent in proportion to the quantity thereof in the liquid to be analyzed, means for forming a second liquid stream flowing concurrently with said first stream in a path to intercept and mix with the separated portion of said crystalloid substance, said last mentioned stream-forming means comprising a conductor therefor, means to introduce air into said conductor for subdividing said second stream in said conductor into alternate air and liquid segments whereby liquid on the inner surface of said conductor is displaced therefrom by said air segments in the flow of the second stream through said conductor, and analyzer means in the path of flow of said second stream for analyzing said second stream.

15. Apparatus for analyzing a liquid containing crystalloid and non-crystalloid constituents to obtain a quantitative indication of a substance contained in said crystalloid constituent, comprising means for forming a flowing stream of said liquid, means in the path of flow of said stream for separating from said flowing stream a portion of said crystalloid constituent thereof from said non-crystalloid constituent in proportion to the quantity thereof in the liquid to be analyzed, means for forming a second liquid stream flowing concurrently with said first stream in a path to intercept and mix with the separated portion of said crystalloid substance, pump means operable to pump said liquid streams in predetermined volumes, and means in the path of flow of said second stream for analyzing the latter.

16. Apparatus for analyzing a liquid containing crystalloid and non-crystalloid constituents to obtain a quantitative indication of a substance contained in said crystalloid constituent, comprising means for forming a flowing stream of said liquid, means in the path of flow of said stream for separating from said flowing stream a portion of said crystalloid constituent thereof from said non-crystalloid constituent in proportion to the quantity thereof in the liquid to be analyzed, means for forming a second liquid stream flowing concurrently with said first stream in a path to intercept and mix with the separated portion of said crystalloid substance, pump means operable to pump said liquid streams in predetermined volumes, and means in the path of flow of said second stream for analyzing the latter, said analyzing means including a colorimeter and a recorder operable under the control of said colorimeter concurrently with the flow of said liquid streams.

17. The method of obtaining a quantitative indication of a crystalloid substance in a liquid which also contains a non-crystalloid constituent, comprising forming a stream containing said liquid and flowing said stream past a separating zone, separating in said zone from said stream and non-crystalloid constituent thereof a portion of the crystalloid substance in proportion to the concentration thereof in said liquid, forming a second liquid into a stream and flowing it concurrently with the first mentioned stream in a path to intercept and mix with the separated portion of said crystalloid substance, said second liquid comprising a reagent capable of reacting with said crystalloid substance to produce a color change in the liquid, flowing the said second liquid containing the crystalloid substance to an analyzing zone in the path of flow thereof, and colorimetrically determining quantitatively the amount of crystalloid substance in said second liquid during its flow through said analyzing zone.

18. The method of obtaining a quantitative indication of a crystalloid substance in a liquid which also contains a non-crystalloid constituent, comprising forming a stream containing said liquid and flowing said stream past a separating zone, separating by dialysis in said zone from said stream and non-crystalloid constituent thereof a portion of the crystalloid substance in proportion to the concentration thereof in said liquid, forming a second liquid into a stream and flowing it concurrently with the first mentioned stream in a path to intercept and mix with the separated portion of said crystalloid substance, said second liquid comprising a reagent capable of reacting with said crystalloid substance to produce a color change in the liquid, flowing the said second liquid containing the crystalloid substance to an analyzing zone in the path of flow thereof; and colorimetrically determining quantitatively the amount of crystalloid substance in said second liquid during its flow through said analyzing zone.

19. The method of obtaining a quantitative indication of a crystalloid substance in a liquid which also contains a non-crystalloid constituent, comprising forming a stream containing said liquid and flowing said stream past a separating zone, separating in said zone from said stream and non-crystalloid constituent thereof a portion of the crystalloid substance in proportion to the concentration thereof in said liquid, forming a second liquid into a stream and flowing it concurrently with the first mentioned stream in a path to intercept and mix with the separated portion of said crystalloid substance, introducing air into said second liquid stream and thereby subdividing it into alternate air and liquid segments, said second liquid comprising a reagent capable of reacting with said crystalloid substance to produce a color change in the liquid, flowing the said second liquid containing the crystalloid substance to an analyzing zone in the path of flow thereof, and colorimetrically determining quantitatively the amount of crystalloid substance in said second liquid during its flow through said analyzing zone.

20. The method of obtaining a quantitative indication of a crystalloid substance in a liquid which also contains a non-crystalloid constituent, comprising forming a stream containing said liquid and flowing said stream past a separating zone, separating by dialysis in said zone from said stream and non-crystalloid constituent thereof a portion of the crystalloid substance in proportion to the concentration thereof in said liquid, forming a second liquid into a stream and flowing it concurrently with the first mentioned stream in a path to intercept and mix with the separated portion of said crystalloid substance, introducing air into said liquid streams for subdividing said streams, respectively, into alternate air and liquid segments, said second liquid comprising a reagent capable of reacting with said crystalloid substance to produce a color change in the liquid, flowing the said second liquid containing the crystalloid substance to an analyzing zone in the path of flow thereof, and colorimetrically determining quantitatively the amount of crystalloid substance in said second liquid during its flow through said analyzing zone.

21. The method of obtaining a quantitative indication of a crystalloid substance in a liquid which also contains a non-crystalloid constituent, comprising forming in a tubular conductor a stream containing said liquid, introducing air into said tubular conductor while the stream is flowing therein, thereby subdividing said stream into alternate air and liquid segments, flowing said stream past a separating zone, separating in said zone from said stream and non-crystalloid constituent thereof a portion of the crystalloid substance in proportion to the concentration thereof in said liquid, forming a second liquid into a stream and flowing it concurrently with the first mentioned stream in a path to intercept and mix with the separated portion of said crystalloid substance, said second liquid comprising a reagent capable of reacting with said crystalloid substance to produce a color change in the liquid, flowing the said second liquid containing the crystalloid substance to an analyzing zone in the path of flow thereof, and colorimetrically determining quantitatively the amount of crystalloid substance in said second liquid during its flow through said analyzing zone.

22. The method of analyzing samples of liquids containing crystalloid and other constituents to obtain a quantitative indication of a crystalloid substance therein, respectively, comprising passing through a dialyzer at one side of the diaphragm thereof a series of the liquid samples in the form of a flowing stream which also includes a processing fluid, concurrently conducting to the other side of said diaphragm a flowing stream of liquid for receiving crystalloid constituents diffused therein and comprising a reagent capable of reacting with said crystalloid substance to produce a color change in the liquid, concurrently exhausting from said one side of the diaphragm, in the form of a continuous outflowing stream, the portions of said samples, respectively, which do not pass through said diaphragm, discharging from said other side of the diaphragm concurrently with the flow of the aforesaid streams of liquid, a flowing stream of liquid containing in successive flowing portions thereof diffused crystalloid constituents of the series of samples, respectively, introducing air into the conductor for said last mentioned stream between said successive flowing portions of the stream, flowing the said second liquid containing the crystalloid substance to an analyzing zone in the path of flow thereof, and colorimetrically determining quantitatively the amount of crystalloid substance in said second liquid during its flow through said analyzing zone in correlated relation with said samples respectively.

23. The method of analyzing samples of liquids containing crystalloid and other constituents to obtain a quantitative indication of a crystalloid substance therein, respectively, comprising passing through a dialzyer at one side of the diaphragm thereof a series of the liquid samples in the form of a flowing stream which also includes a processing fluid, concurrently conducting to the other side of said diaphragm a flowing stream of liquid for receiving crystalloid constituents diffused therein and comprising a reagent capable of reacting with said crystalloid substance to produce a color change in the liquid, concurrently exhausting from said one side of the diaphragm, in the form of a continuous outflowing stream, the portions of said samples, respectively, which do not pass through said diaphragm, discharging from said other side of the diaphragm concurrently with the flow of the aforesaid streams of liquid, a flowing stream of liquid containing in successive flowing portions thereof diffused crystalloid constituents of the series of samples, respectively, flowing the said second liquid containing the crystalloid substance to an analyzing zone in the path of flow thereof, and colorimetrically determining quantitatively the amount of crystalloid substance in said second liquid during its flow through said analyzing zone in correlated relation with said samples respectively.

24. The method of obtaining a quantitative indication of a crystalloid substance in a liquid which also contains a non-crystalloid constituent, comprising forming a stream containing said liquid and flowing said stream past a separating zone, separating in said zone from said stream and non-crystalloid constituent thereof a portion of the crystalloid substance in proportion to the concentration thereof in said liquid, forming a second liquid into a stream and flownig in concurrently with the first mentioned stream in a path to intercept and mix with the separated portion of said crystalloid substance, introducing air into said liquid streams for subdividing said streams, respectively, into alternate air and liquid segments, said second liquid comprising a reagent capable of reacting with said crystalloid substance to produce a color change in the liquid, flowing the said second liquid containing the crystalloid substance to an analyzing zone in the path of flow thereof, and colorimetrically determining quantitatively the amount of crystalloid substance in said second liquid during its flow through said analyzing zone.

25. The method of obtaining a quantitative indication of a crystalloid substance in a liquid which also contains a non-crystalloid constituent, comprising forming a stream containing said liquid and flowing said stream past a separating zone, separating in said zone from said stream and non-crystalloid constituent thereof a portion of the crystalloid substance in proportion to the concentration thereof in said liquid, forming a second liquid into a stream and flowing it concurrently with the first mentioned stream in a path to intercept and mix with the separated portion of said crystalloid substance, said second liquid comprising a reagent capable of reacting with said crystalloid substance to produce a change in the liquid enabling a quantitative determination of the crystalloid substance to be made, flowing the said second liquid containing the crystalloid substance to an analyzing zone in the path of flow thereof, and determining quantitatively the amount of crystalloid substance in said second liquid during its flow through said analyzing zone.

26. The method of obtaining a quantitative indication of a crystalloid substance in a liquid which also contains a non-crystalloid constituent, comprising forming a stream containing said liquid and flowing said stream past a separating zone, separating by dialysis in said zone from said stream and non-crystalloid constituents thereof a portion of the crystalloid substance in proportion to the concentration thereof in said liquid, forming a second liquid into a stream and flowing it concurrently with the first mentioned stream in a path to intercept and mix with the separated portion of said crystalloid substance, said second liquid comprising a reagent capable of reacting with said crystalloid substance to produce a change in the liquid enabling a quantitative determination of the crystalloid substance to be made, flowing the said second liquid containing the crystalloid substance to an analyzing zone in the path of flow thereof, and determining quantitatively the amount of crystalloid substance in said second liquid during its flow through said analyzing zone.

References Cited in the file of this patent

UNITED STATES PATENTS

| Number | Name | Date |
|---|---|---|
| 237,835 | Dubrunfaut | Feb. 15, 1881 |
| 1,623,342 | Harrington | Apr. 5, 1927 |
| 2,140,341 | Wallach et al. | Dec. 13, 1938 |
| 2,331,573 | Sheftel | Oct. 12, 1943 |
| 2,408,900 | Alston et al. | Oct. 8, 1946 |
| 2,587,221 | Richardson et al. | Feb. 26, 1952 |
| 2,633,410 | Beckley | Mar. 31, 1953 |
| 2,639,979 | Goodman | May 26, 1953 |
| 2,652,314 | Drey | Sept. 15, 1953 |
| 2,680,060 | Natelson | June 1, 1954 |

OTHER REFERENCES

Getman and Daniels: "Outlines of Physical Chemistry," 7th ed., 1943, pages 234, 235. Publ. by John Wiley and Sons, Inc., N. Y. C.

Morell: I. and E. Chem., Analytical Ed., vol. 13 (1941), pages 249, 250, 251.

Guarino: Science, vol. 115, No. 2985, March 14, 1952, pages 285, 286, 287.

Merrill: Jour. of Clinical Investigation, vol. XXIX, No. 4, pages 425, 426, April 1950.